(12) United States Patent
Shimizu et al.

(10) Patent No.: US 8,958,017 B2
(45) Date of Patent: Feb. 17, 2015

(54) RECEPTION APPARATUS AND ELECTRONIC EQUIPMENT

(71) Applicant: Sony Corporation, Tokyo (JP)

(72) Inventors: Hiroyuki Shimizu, Saitama (JP); Tomonori Nakajima, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 14/201,101

(22) Filed: Mar. 7, 2014

(65) Prior Publication Data

US 2014/0267930 A1 Sep. 18, 2014

(30) Foreign Application Priority Data

Mar. 15, 2013 (JP) ................................. 2013-053129

(51) Int. Cl.
*H04N 5/50* (2006.01)
(52) U.S. Cl.
CPC ...................................... *H04N 5/50* (2013.01)
USPC ............................ 348/732; 348/725; 348/731
(58) Field of Classification Search
USPC ......... 348/731–732, 552–553, 725, 570, 569; 725/72, 68, 70–71; 455/188.1, 180.2, 455/118, 120, 123, 193.1

IPC ........................................................ H04N 5/50
See application file for complete search history.

(56) References Cited

U.S. PATENT DOCUMENTS

| 7,643,098 | B2 * | 1/2010 | Kim .............................. 348/731 |
| 7,904,024 | B2 * | 3/2011 | Dessert et al. ................ 455/63.1 |
| 8,350,970 | B2 * | 1/2013 | Birkett et al. ................. 348/731 |
| 2004/0250284 | A1 * | 12/2004 | Dong et al. ..................... 725/68 |

FOREIGN PATENT DOCUMENTS

JP 2009-188515 8/2009

* cited by examiner

*Primary Examiner* — Trang U Tran
(74) *Attorney, Agent, or Firm* — Sheridan Ross P.C.

(57) ABSTRACT

A reception apparatus includes a plurality of reception circuits disposed in a predetermined arrangement state, a plurality of local oscillation circuits each of which supplies a local oscillation signal to each of the plurality of reception circuits, and a control unit that controls each reception circuit and each local oscillation circuit. When there is a specific reception circuit to which a local oscillation signal is supplied, of which frequency matches or is close to a passing frequency during a search of a reception signal with a tuning request, the control unit performs the search of the reception signal with the tuning request in a reception circuit disposed at a position far from the specific reception circuit.

6 Claims, 11 Drawing Sheets

FIG. 5

SEARCH ALGORITHM 1

SEARCH ALGORITHM 2

SEARCH ALGORITHM 3

RECEPTION APPARATUS AND ELECTRONIC EQUIPMENT

CROSS REFERENCE TO RELATED APPLICATIONS

This application claims the benefit of Japanese Priority Patent Application JP 2013-053129 filed Mar. 15, 2013, the entire contents of which are incorporated herein by reference.

BACKGROUND

The present disclosure relates to a reception apparatus which receives a transmission signal such as a television broadcast signal, and electronic equipment including the reception apparatus.

In recent years, apparatuses including a plurality of reception circuits are developed as television receivers or recording apparatuses which have reception circuits which receive television broadcast. For example, the television receivers including the plurality of reception circuits can simultaneously display received images from a plurality of channels on display screens. Further, the recording apparatuses including the plurality of reception circuits can simultaneously record broadcast signals from a plurality of channels on display screens.

Figure 11:
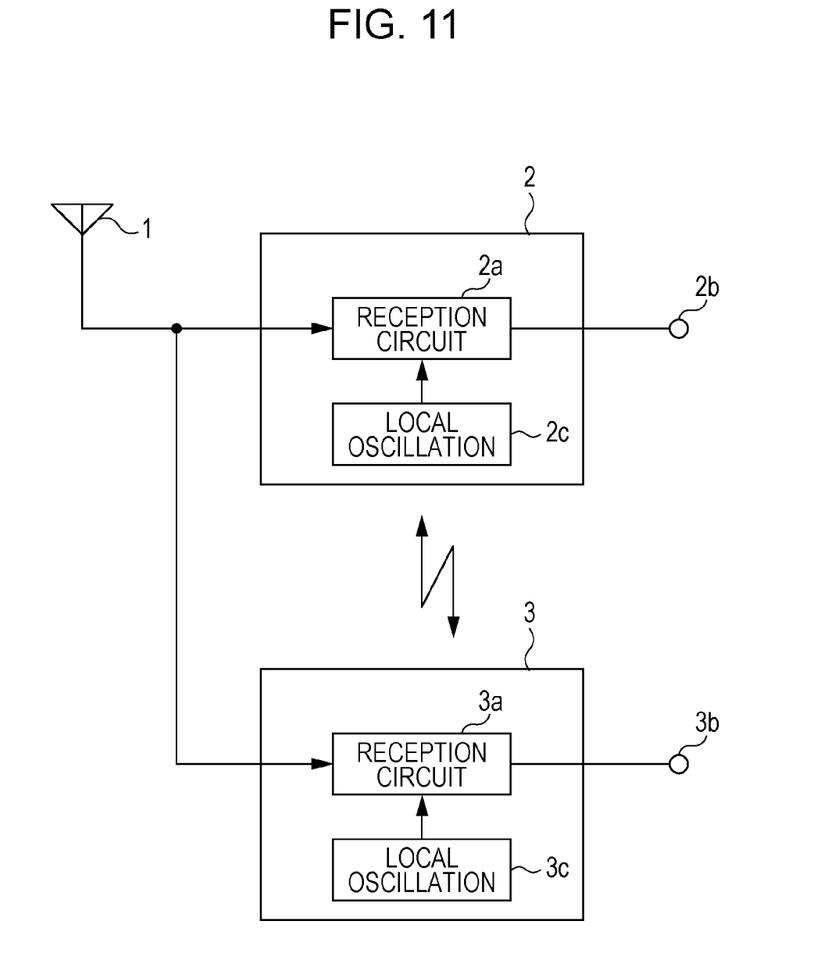
FIG. 11 is a circuit diagram showing an example of a reception apparatus in the related art.

FIG. 11 is a diagram showing an example of an apparatus including a plurality of reception circuits in the related art.

A signal received from an antenna 1 is supplied to first and second tuner units 2 and 3. The first and second tuner units 2 and 3 respectively include reception circuits 2a and 3a. Each of the reception circuits 2a and 3a receives a broadcast signal of a specific channel (frequency). The channel received by each of the reception circuits 2a and 3a is determined by, for example, an instruction from a control unit (not shown) in the apparatus.

Each of the reception circuits 2a and 3a obtains a baseband signal or an intermediate frequency signal which is obtained by converting the broadcast signal. In order to obtain such a baseband signal or an intermediate frequency signal, a frequency signal (local oscillation frequency signal) is necessary which is mixed with the reception signal in a mixer (not shown) in the reception circuits 2a and 3a. The local oscillation frequency signal to be mixed with the reception signal in the mixer is obtained by local oscillation circuits 2c and 3c which are embedded in the respective tuner units 2 and 3.

Each of the reception circuits 2a and 3a performs a demodulation process of the baseband signal or the intermediate frequency signal. A video signal and an audio signal which are obtained by the demodulation process are obtained in the output terminals 2b and 3b of the reception circuits 2a and 3a.

In Japanese Unexamined Patent Application Publication No. 2009-188515, a technology is described which stops an operation of an unused reception circuit so as to avoid an interference wave from occurring, in a system including a plurality of reception circuits.

SUMMARY

However, when there are a plurality of tuner units 2 and 3 as shown in FIG. 11, there is a possibility that the local oscillation frequency used in reception in one tuner unit 2 or 3 disturbs the reception of the other tuner unit 3 or 2. Although FIG. 11 shows an example having two tuner units 2 and 3, when three or more tuner units are included, the possibility of disturbing each other is increased.

Particularly, in recent years, miniaturization of electronic equipment including tuner units has progressed, and the tuner unit 2 or 3 itself is formed into an integrated circuit, or the like so as to be miniaturized. Accordingly, in many types of electronic equipment, as shown in FIG. 11, the plurality of tuner units 2 and 3 are disposed very close to each other physically so that there is a concern that unnecessary radiation of a separate tuner unit deteriorates the reception performance.

It is desirable to provide a reception apparatus and electronic equipment which are capable of preventing the occurrence of the interference wave in each reception circuit when the plurality of reception circuits are provided.

According to an embodiment of the present disclosure, there is provided a reception apparatus including a plurality of reception circuits disposed in a predetermined arrangement state, a plurality of local oscillation circuits each of which supplies a local oscillation signal to each of the plurality of reception circuits, and a control unit that controls each reception circuit and each local oscillation circuit.

When there is a specific reception circuit to which a local oscillation signal is supplied, of which frequency matches or is close to a passing frequency during a search of a reception signal with a tuning request, the control unit performs the search of the reception signal with the tuning request in a reception circuit disposed at a position far from the specific reception circuit.

According to another embodiment of the present disclosure, there is provided electronic equipment including a plurality of reception circuits disposed in a predetermined arrangement state, a plurality of local oscillation circuits each of which supplies a local oscillation signal to each of the plurality of reception circuits, a control unit that controls each reception circuit and each local oscillation circuit, and a processing unit that processes signal which are received.

When there is a specific reception circuit to which a local oscillation signal is supplied, of which frequency matches or is close to a passing frequency during a search of a reception signal with a tuning request, the control unit performs the search of the reception signal with the tuning request in a reception circuit disposed at a position far from the specific reception circuit.

According to the present disclosure, since the search of the reception signal with the tuning request is performed in a reception circuit disposed at a position far from the specific reception circuit, it is possible to suppress a possibility that the search of the reception signal causes a disturbance at the minimum level in the reception process in the specific reception circuit.

According to the present disclosure, when a plurality of reception circuits simultaneously perform reception processes, it is possible to suppress a possibility that the search of the reception signal causes a disturbance at the minimum level.

DETAILED DESCRIPTION OF EMBODIMENTS

Figure 1:
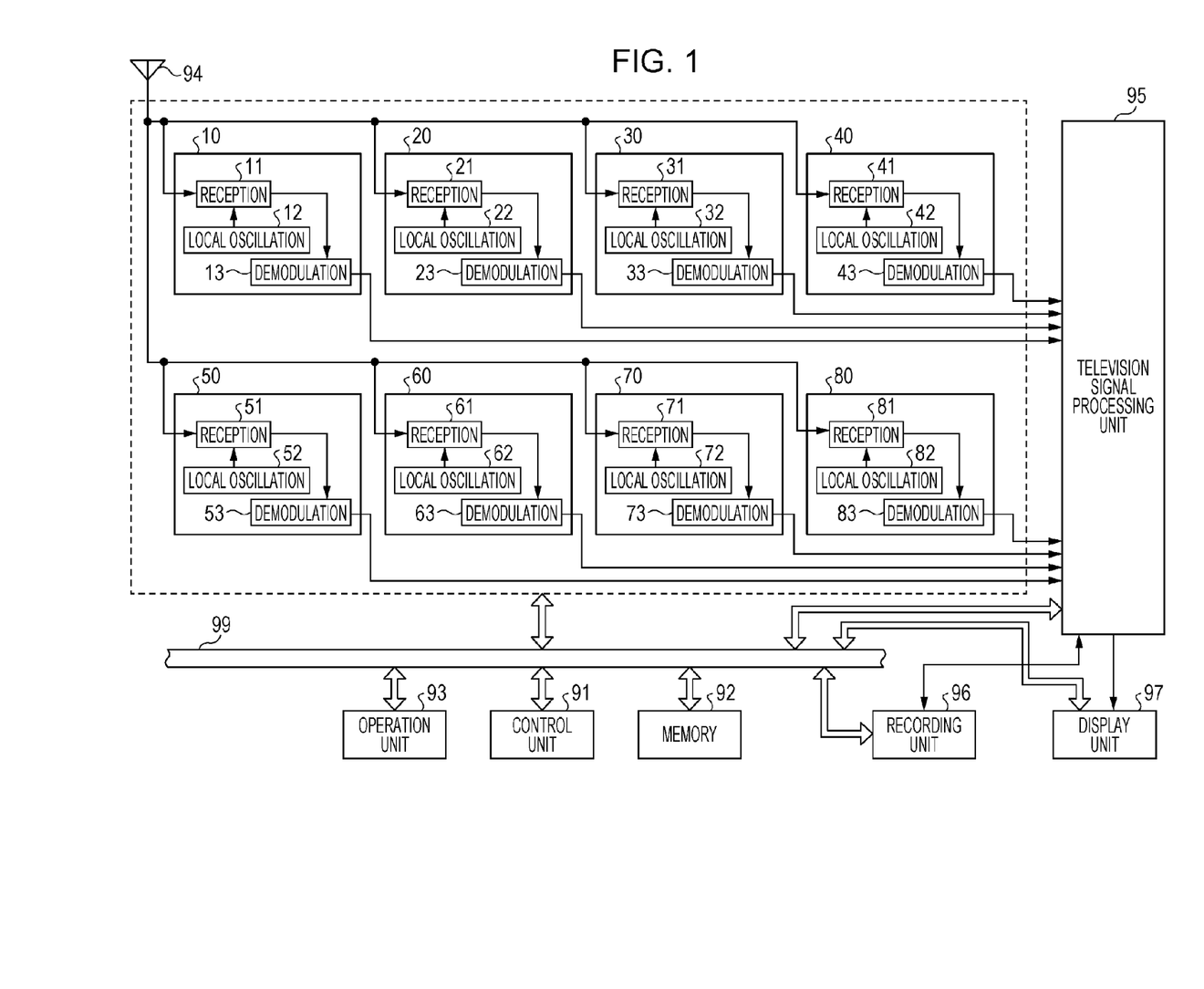
FIG. 1 is a block diagram showing a configuration example of a reception apparatus according to an embodiment of the present disclosure.
Figure 3:
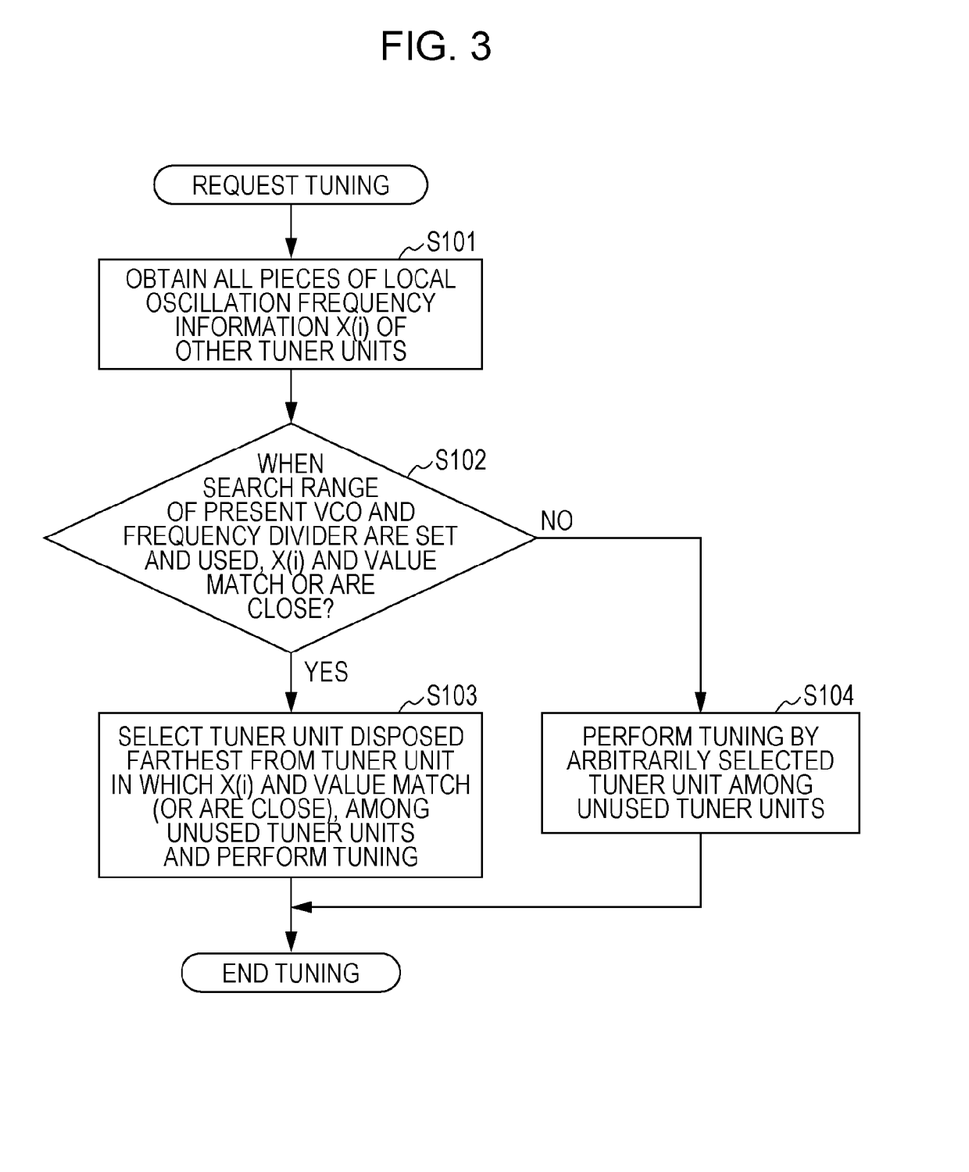
FIG. 3 is a flow chart showing a selection process example (Example 1) of a tuner unit according to the embodiment of the present disclosure.
Figure 4:
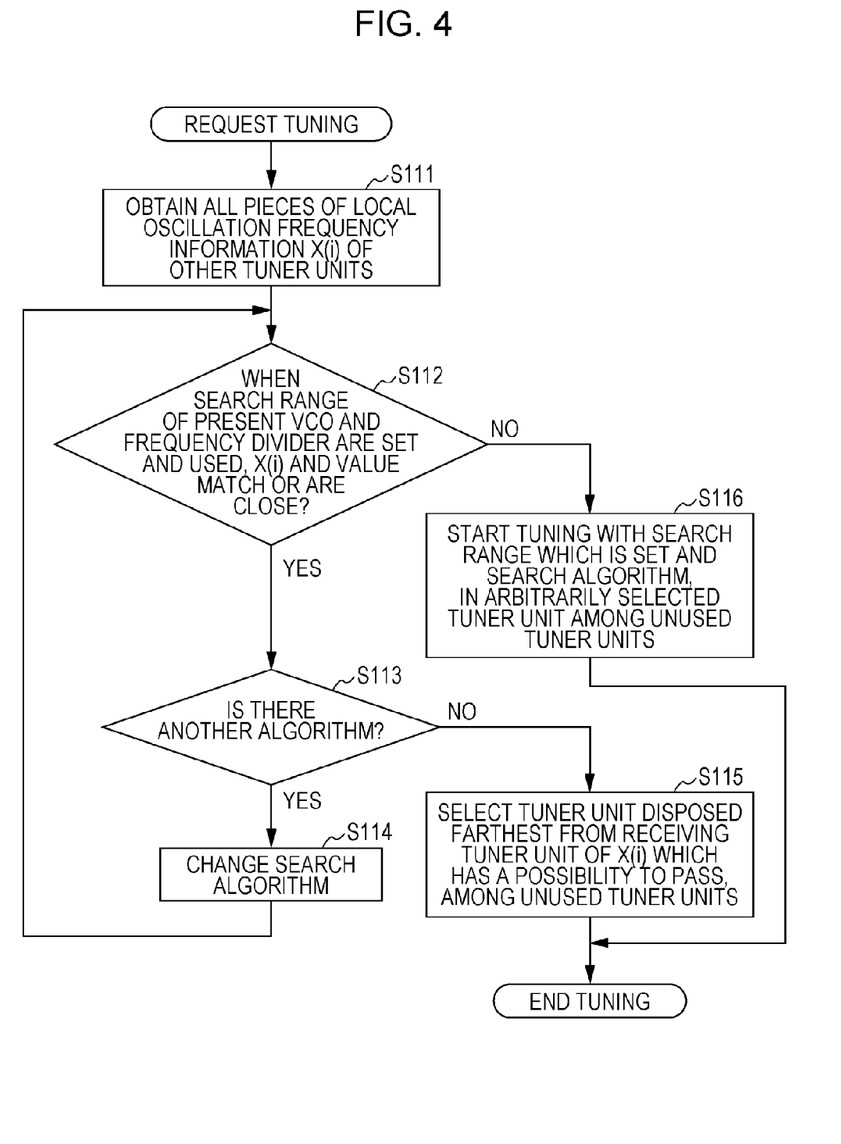
FIG. 4 is a flow chart showing a selection process example (Example 2) of a tuner unit according to the embodiment of the present disclosure.

Examples of a reception apparatus and electronic equipment according to embodiments of the present disclosure will be described with reference to drawings in the following order:

1. Configuration Example of a Reception Apparatus (FIGS. 1 and 2)
2. Selection Process Example of a Tuner Unit (Example 1: FIG. 3)
3. Selection Process Example of a Tuner Unit (Example 2: FIG. 4)
4. Respective Examples of a Search Algorithm (FIGS. 5 to 10)
5. Modification Example 1. Configuration Example of a Reception Apparatus FIG. 1 is a diagram showing a configuration example of a reception apparatus according to an example of an embodiment of the present disclosure.

The reception apparatus according to the embodiment of the present disclosure is an apparatus of receiving a television broadcast signal, and includes a plurality of (in this example, eight) tuner units 10, 20, 30, 40, 50, 60, 70, and 80. The signals received in an antenna 94 are supplied to the tuner units 10 to 80.

Each of the tuner units 10 to 80 is disposed on a substrate or the like in a predetermined arrangement. The example of FIG. 1 shows a case in which eight tuner units 10 to 80 are arranged in two rows in the vertical direction as well as arranged in a four-by-four arrangement in the horizontal direction. However, the arrangement is only an example and other arrangements may be used. For example, eight tuner units 10 to 80 may be arranged in a row.

Respective tuner units 10 to 80 include reception circuits 11, 21, 31, 41, 51, 61, 71, and 81, respectively, and each of the reception circuits 11 to 81 receives a transmission signal (broadcast signal) of a specific channel (frequency). The frequency received by each of the reception circuits 11 to 81 is set by a local oscillation signal which is supplied from each of local oscillation circuits 12, 22, 32, 42, 52, 62, 72, and 82 which are included in respective tuner units 10 to 80. The frequency received by each of the reception circuits 11 to 81 is determined according to an instruction from a control unit 91. The generation status of the local oscillation signal in each of the local oscillation circuits 12 to 82 is also determined according to the instruction from the control unit 91. The control unit 91 can communicate with each of the tuner units 10 to 80 through a bus line 99.

For example, when an instruction of tuning a specific channel is arrived from an operation unit 93, the control unit 91 instructs one specific tuner unit (for example, first tuner unit 10) among the tuner units 10 to 80 to receive a corresponding channel. In this case, the control unit 91 searches for a frequency through which a reception channel is transmitted, using one search algorithm selected among a plurality of search algorithms stored in the memory 92. In addition, the details of a plurality of search algorithms will be described later.

Each of the reception circuits 11 to 81 acquires a baseband signal or an intermediate frequency signal obtained by performing a frequency-conversion on the broadcast signal using a reception process. Demodulation circuits 13, 23, 33, 43, 53, 63, 73, and 83 which are respectively connected to the respective reception circuits 11 to 81 perform a demodulation process of the baseband signal or the intermediate frequency signal. Video signals and audio signals obtained by the demodulation process in the demodulation circuits 13 to 83 are supplied from respective tuner units 10 to 80 to the television signal processing unit 95.

The video signals and the audio signals which are processed in the television signal processing unit 95 are supplied to and recorded in the recording unit 96. Further, the video signals which are processed in the television signal processing unit 95 are supplied to and displayed on the display unit 97. For example, when the recording unit 96 records eight different channels at the same time, by an instruction from the control unit 91, each of the eight tuner units 10 to 80 performs a reception operation of respectively instructed channel. According to the number of channels which are received at the same time, the control unit 91 stops the reception operation of a tuner unit which does not ask for a reception operation (any one of the tuner units 10 to 80).

Each of eight tuner units 10 to 80 are separately formed into an integrated circuit and disposed on a circuit substrate in a predetermined arrangement. Alternatively, eight tuner units 10 to 80 may be formed into one integrated circuit. In the example of the present embodiment, all frequency bands received by eight tuner units 10 to 80 are the same.

In addition, in the example of FIG. 1, although each of the tuner units 10 to 80 is intended to perform the demodulation process on the reception signal, each of the tuner units 10 to 80 may be configured not to perform the demodulation process. In other words, a processing unit which is connected to the rear stage of each of the tuner units 10 to 80 may perform the demodulation process on the baseband signal or the intermediate frequency signal which are output by each of the tuner units 10 to 80.

Figure 2:
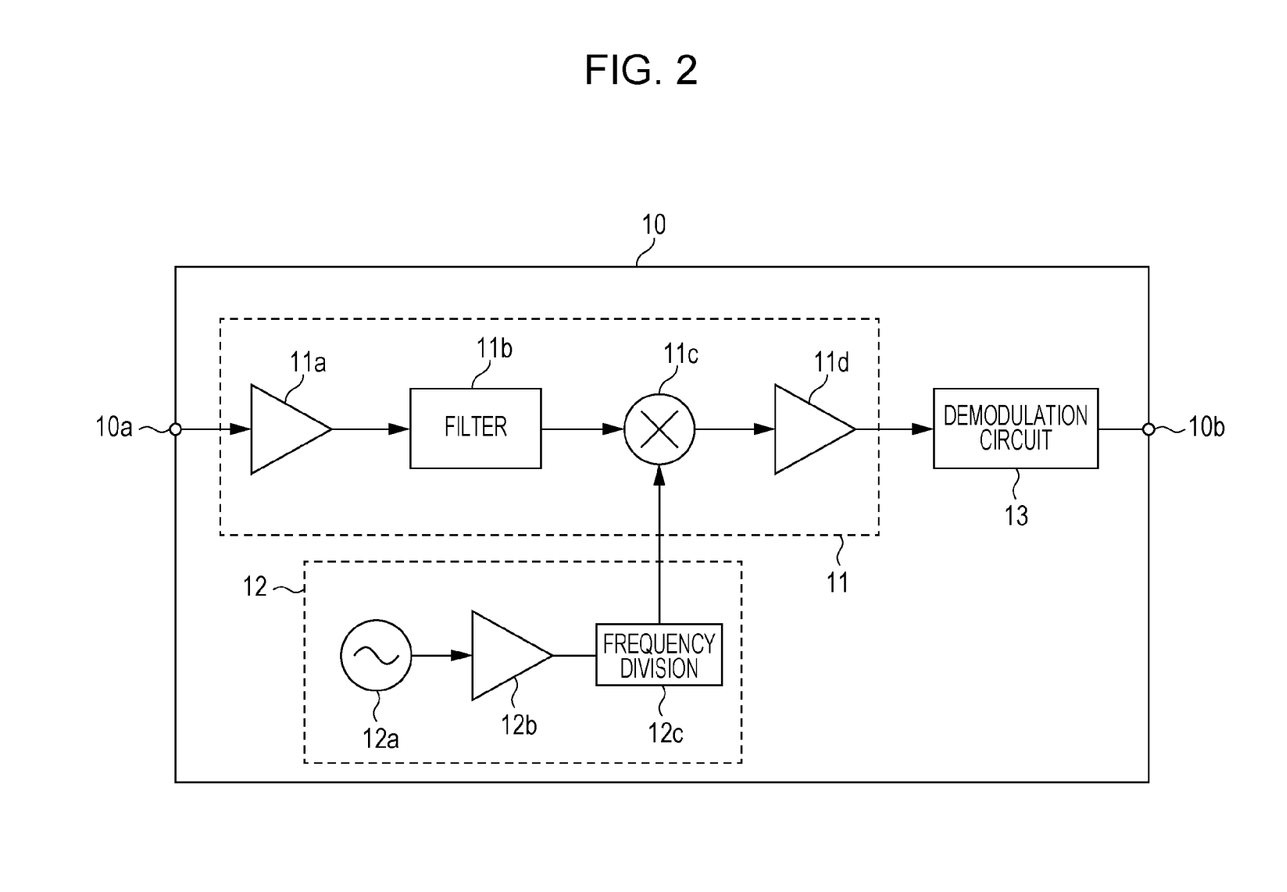
FIG. 2 is a block diagram showing an example of a reception circuit of the embodiment of the present disclosure.

FIG. 2 is a diagram showing an example of a configuration of the first tuner unit 10. The second tuner unit 20 to eighth tuner unit 80 have the same configurations as that of the first tuner unit 10.

The reception circuit 11 includes an amplifying circuit 11a that amplifies a high frequency signal which is a transmission signal obtained in the input terminal 10a, a filter 11b that performs a band limitation of the high frequency signal that is amplified by the amplifying circuit 11a, and a mixer 11c to which the output of the filter 11b is supplied. The mixer 11c mixes the high frequency signal supplied from the filter 11b with the local oscillation signal supplied from the local oscillation circuit 12, and converts the mixed signal to a baseband signal or an intermediate frequency signal. The baseband signal or the intermediate frequency signal which is converted by the mixer 11c is supplied to a demodulation circuit 13 through an amplifying circuit 11d.

The local oscillation circuit 12 includes a voltage controlled oscillator 12a, an amplifying circuit 12b that amplifies an oscillation signal that is output by the voltage controlled oscillator 12a, and a frequency divider 12c that frequency-divides the oscillation signal which is output by the amplifying circuit 12b. The frequency of the oscillation signal that is output by the voltage controlled oscillator 12a and a frequency division ratio of the frequency division performed by the frequency divider 12c are set under the control of the control unit 91 (FIG. 1). In addition, the voltage controlled oscillator 12a and the frequency divider 12c are a part of a circuit forming a Phase Locked Loop (PLL), and performs a feedback control to stabilize the oscillation frequency. Further, since the configuration of the PLL is already known, the configuration of the PLL is omitted in FIG. 2.

The demodulation circuit 13 performs a demodulation process of the baseband signal or the intermediate frequency signal which is supplied. The video signal and the audio signal which are demodulated by the demodulation circuit 13 are supplied from the output terminal 10b to the processing unit (television signal processing unit 95 in FIG. 1) in the rear stage. A configuration in which the first tuner unit 10 includes the demodulation circuit 13 as described above is an example, but the tuner unit may be configured not to include a demodulation circuit.

2. Selection Process Example of a Tuner Unit

Example 1

Next, described is a selection process example of a tuner unit that performs reception when the control unit 91 instructs each of the tuner units 10 to 80 to perform reception. In the embodiment of the present disclosure, two selection examples including Example 1 and Example 2 will be described. In addition, even in either Example 1 or Example 2 to be described later, each process is performed when two or more unused tuner units which do not receive broadcast signals are present. When only one unused tuner unit is present, the control unit 91 does not perform the process of the flowcharts of FIGS. 3 and 4, but determines the one unused tuner unit as a tuner unit that performs reception.

First, the selection process example of a tuner unit that performs reception [Example 1] will be described with reference to the flow chart of FIG. 3.

First, the control unit 91 obtains all pieces of frequency information X(i) of local oscillation signals which are generated by the local oscillation circuits 12 to 82 of the tuner units 10 to 80 which performs reception, among eight tuner units 10 to 80 which are prepared (step S101). At this time, the frequency information X(i) of local oscillation signal which is determined by the control unit 91 contains information of the oscillation frequency of the voltage controlled oscillator included in each of the local oscillation circuits 12 to 82 and information of a frequency division ratio of the frequency divider.

Then, the control unit 91 determines a search frequency range (lower limit frequency and upper limit frequency) in the search of the broadcast signal of the channel having a current tuning request, and a variable range of the oscillation frequency of the voltage controlled oscillator and a frequency division ratio of the frequency divider in the search of the frequency range. Then, the control unit 91 compares the setting of the variable range of the oscillation frequency for receiving the channel having a tuning request with the oscillation frequency of the voltage controlled oscillator of each tuner unit which is currently performing reception, and determines whether they are match or close to each other (step S102).

In the determination of step S102, it is determined that the variable range of the oscillation frequency for receiving the channel having a tuning request matches or is close to the oscillation frequency of the voltage controlled oscillator of each tuner unit which is currently performing reception, and then the control unit 91 proceeds to the process of step S103.

In the process of step S103, the control unit 91 selects the tuner unit disposed farthest from the tuner unit performing reception of which the oscillation frequency matches or close to the variable range among unused tuner units, as the tuner unit receiving the channel having a tuning request. For example, when the channel having a tuning request is searched, it is determined that the oscillation frequency in the first tuner unit 10 may match the variable range, and it is assumed that the second tuner unit 20 and the eighth tuner unit 80 are unused. At this time, since the second tuner unit 20 is adjacent to the first tuner unit 10 and the eighth tuner unit 80 is far from the first tuner unit 10, the control unit 91 selects the eighth tuner unit 80 as a reception tuner.

In addition, in the determination of step S102, when it is determined that the variable range of the oscillation frequency for receiving the channel having a tuning request does not match or is not close to the oscillation frequency of the voltage controlled oscillator of each tuner unit which is currently performing reception, the control unit 91 proceeds to the process of step S104.

In the process of step S104, the control unit 91 selects a tuner unit which is arbitrarily selected from the unused tuner units as a tuner unit which receives the channel having a tuning request.

Then, the control unit 91 starts the search in the tuner unit in the search frequency range which is set. When the broadcast signal of the desired channel is received by the search, the reception at the reception frequency at that time is performed and the tuning by the control of the control unit 91 is completed.

3. Selection Process Example of a Tuner Unit

Example 2

Next, the selection process example of a tuner unit that performs reception [Example 2] will be described with reference to the flow chart of FIG. 4. In the selection process example of the Example 2 is an example in which a plurality of algorithms are present when the broadcast signal of the channel having a current tuning request is searched. Although the detailed example of the plurality of algorithms will be described later, for example, there are a search algorithms that performs a search from a lower limit of a search range, a search algorithms that performs a search from an upper limit thereof, and the like, and the search range changes depending on the search algorithms even when the same frequency is received.

First, the control unit 91 obtains all pieces of frequency information X(i) of local oscillation signals which are generated by the local oscillation circuits 12 to 82 of the tuner units 10 to 80 which performs reception, among eight tuner units 10 to 80 which are prepared (step S111).

Then, the control unit 91 determines a search frequency range in the current search algorithm in the search of the broadcast signal of the channel having a current tuning request, and a variable range of the oscillation frequency of the voltage controlled oscillator and a frequency division ratio of the frequency divider in the search of the frequency range. Then, the control unit 91 compares the setting of the variable range of the oscillation frequency for receiving the channel having a tuning request with the oscillation frequency of the voltage controlled oscillator of each tuner unit which is currently performing reception, and determines whether they are match or are close to each other (step S112).

In the determination of step S112, when it is determined that the variable range of the oscillation frequency for receiving the channel having a tuning request matches or is close to the oscillation frequency of the voltage controlled oscillator of each tuner unit which is currently performing reception, the control unit 91 proceeds to the process of step S113.

In the process of step S113, the control unit 91 determines whether or not change from the search algorithm to a separate search algorithm is possible. When it is determined that the change to a separate search algorithm is possible in the determination, the control unit 91 changes the algorithm searching the channel having a tuning request to the separate search algorithm (step S114). Then, after the change in step S114 is performed, the control unit 91 returns to the determination process of step S112.

Then, when it is determined that no further change to the separate search algorithm is possible in the determination of step S113, the control unit 91 proceeds to the process of step S115.

In the process of step S115, the tuner unit disposed farthest from the tuner unit performing reception of which the oscillation frequency matches or is close to the variable range among unused tuner units is selected as the tuner unit receiving the channel having a tuning request.

In addition, in the determination of step S112, when it is determined that the variable range of the oscillation frequency for receiving the channel having a tuning request does not match or close to the oscillation frequency of the voltage controlled oscillator of each tuner unit which is currently performing reception, the control unit 91 proceeds to the process of step S116.

In the process of step S116, the control unit 91 selects a tuner unit which is arbitrarily selected from the unused tuner units as a tuner unit which receives the channel having a tuning request.

Then, the control unit 91 starts the search in the tuner unit that is selected in step S115 or S116. When the broadcast signal of the desired channel is received by the search, the reception at the reception frequency at that time is performed and the selection by the control of the control unit 91 is completed.

In addition, although the search algorithm is changed in step S114, the control unit 91 may change a frequency division ratio of the frequency divider instead of changing a search algorithm so as to change the variable range of the oscillation frequency of the voltage controlled oscillator.

4. Respective Examples of a Search Algorithm

Next, the specific examples of the plurality of search algorithms that have been described in the selection process example of the tuner unit of Example 2 described above will be described with reference to FIGS. 5 to 10.

Here, three search algorithms, a search algorithm 1 to a search algorithm 3, will be described. The programs for executing the three search algorithms are stored in, for example, in the memory 92. Then the control unit 91 first sets any one of the three search algorithms, and a process of changing the search algorithm to another search algorithm is performed in step S114 in the flowchart of FIG. 4.

In the description regarding the following search algorithms 1 to 3, it is assumed that the first tuner unit 10 receives signals.

Search Algorithm 1

Figure 5:
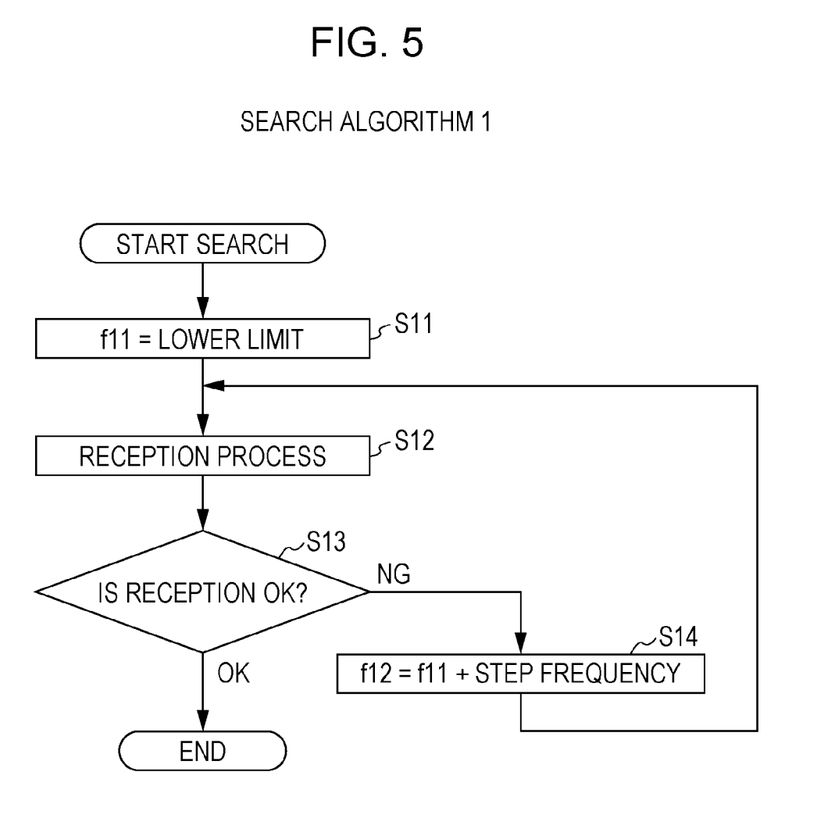
FIG. 5 is a flow chart showing an example of a search algorithm 1 according to the embodiment of the present disclosure.
Figure 6:
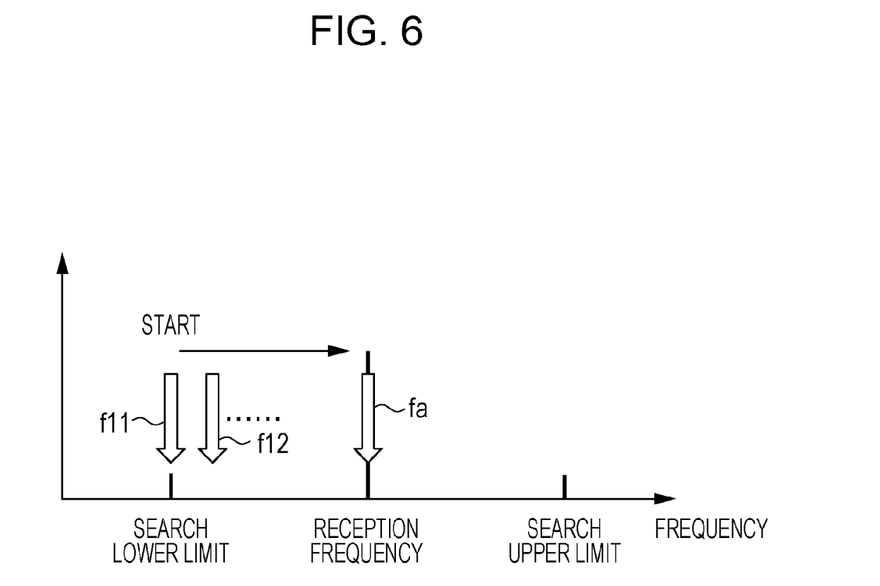
FIG. 6 is a characteristic diagram showing a process example of the search algorithm 1 according to the embodiment of the present disclosure.

FIG. 5 is a flow chart showing an example of a search algorithm 1. FIG. 6 is a diagram showing an example of a change of the reception frequency when the search algorithm 1 is performed.

The search algorithm 1 is intended to perform a linear search from a lower limit of a search range. In other words, as shown in FIG. 5, when the search algorithm 1 is performed, the control unit 91, first, determines a search range of the search of a transmission frequency of a desired channel, and sets the lower limit frequency f11 of the search range to a frequency fx to be first searched (step S11). Then, in order to receive the lower limit frequency f11, the control unit 91 sets the reception frequency in the tuner unit 10 (step S12). At this time, the control unit 91 instructs the local oscillation circuit 12 to generate a local oscillation signal of which frequency is the frequency corresponding to the lower limit frequency f11.

Then, the control unit 91 determines whether or not the broadcast signal of the desired channel in the reception process is received (step S13). In the determination, when the broadcast signal of the desired channel is received, the reception at the frequency continues and the search process is ended.

In the determination of step S13, when the broadcast signal of the desired channel is not received, the control unit 91 shifts the frequency fx to which is searched by the tuner unit 10 to the frequency f12 which is one step above the present search frequency f11 (step S14). Then, in order to receive the search frequency f12, the control unit 91 sets the reception frequency in the tuner unit 10 (step S12).

Hereinafter, until the tuner unit 10 can receive the broadcast signal of the desired channel, the control unit 91 causes the process of steps S12, S13, and S14 to be repeated. In addition, although step S14 of FIG. 5 shows the change in the search frequency from the frequency f11 to the frequency f12, the frequency that is set is changed to f12, f13, and ... one step at each time when the process of the step S14 is repeated.

FIG. 6 shows an example of a change of the reception frequency of the tuner unit 10 when the control unit 91 performs the search algorithm 1. As shown in FIG. 6, the reception frequency of the tuner unit 10 is first the lower limit frequency f11 of the search range, thereafter, changes to the frequency f12 which is one-step greater, and then is gradually increased at the same frequency interval. Then, when the broadcast signal of the desired channel is received in the tuner unit 10 at the reception frequency fa, the control unit 91 fixes the reception frequency of the tuner unit 10 to the frequency fa and ends the search process.

Search Algorithm 2

Figure 7:
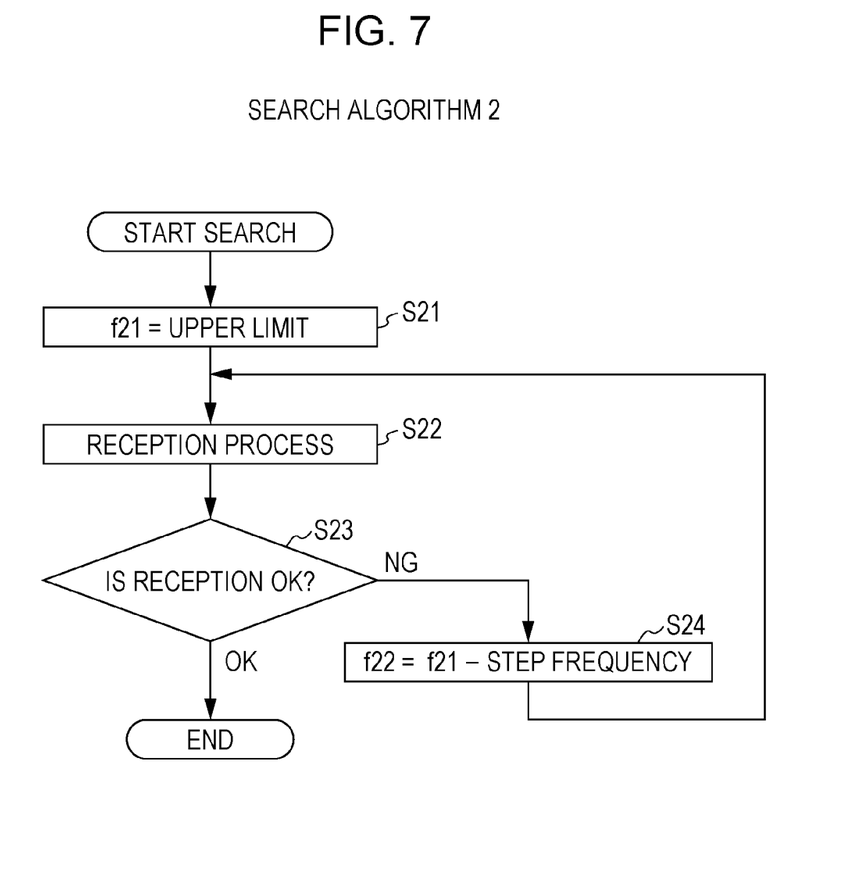
FIG. 7 is a flow chart showing an example of a search algorithm 2 according to the embodiment of the present disclosure.
Figure 8:
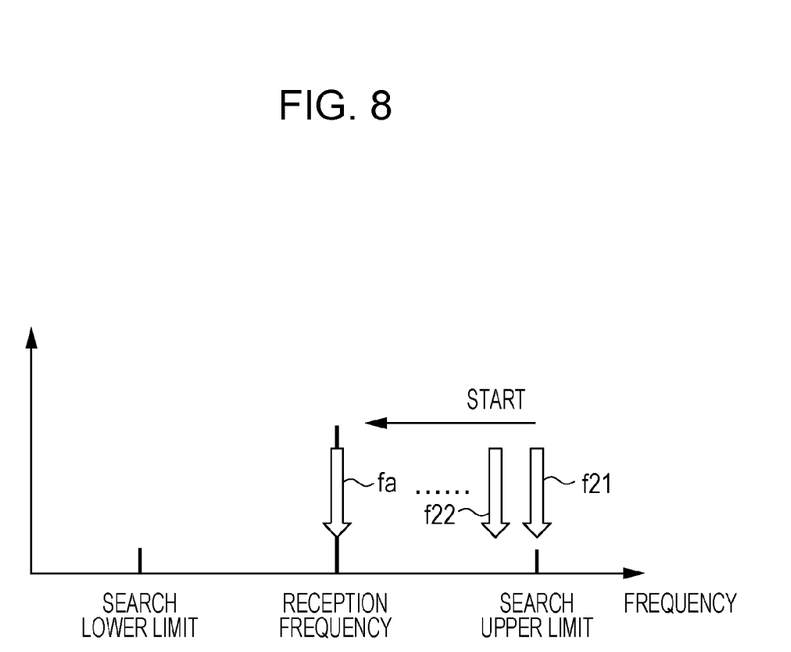
FIG. 8 is a characteristic diagram showing a process example of the search algorithm 2 according to the embodiment of the present disclosure.

FIG. 7 is a flow chart showing a search algorithm 2. FIG. 8 is a diagram showing an example of a change of the reception frequency when the search algorithm 2 is performed.

The search algorithm 2 is intended to perform a linear search from the upper limit of a search range. In other words, as shown in FIG. 7, when the search algorithm 2 is performed, the control unit 91, first, determines a search range of the search of a transmission frequency of a desired channel, and sets the upper limit frequency f21 of the search range to a frequency fx to be first searched (step S21). Then, in order to receive the upper limit frequency f21, the control unit 91 sets the reception frequency in the tuner unit 10 (step S22). At this time, the control unit 91 instructs the local oscillation circuit 12 to generate a local oscillation signal of which frequency is the frequency corresponding to the upper limit frequency f21.

Then, the control unit 91 determines whether or not the broadcast signal of the desired channel in the reception process is received (step S23). In the determination, when the broadcast signal of the desired channel is received, the reception at the frequency continues and the search process is ended.

In the determination of step S23, when the broadcast signal of the desired channel is not received, the control unit 91 shifts the frequency fx which is searched by the tuner unit 10 to the frequency f22 which is one step below the present search frequency f21 (step S24). Then, in order to receive the search frequency f22, the control unit 91 sets the reception frequency in the tuner unit 10 (step S22).

Hereinafter, until the tuner unit 10 can receive the broadcast signal of the desired channel, the control unit 91 causes the process of steps S22, S23, and S24 to be repeated. In addition, although step S24 of FIG. 7 shows the change in the search frequency from the frequency f21 to the frequency f22, the frequency that is set is changed to f22, f23, and ... one step at each time when the process of the step S24 is repeated.

FIG. 8 shows an example change of the reception frequency in the tuner unit 10 when the control unit 91 performs the search algorithm 2. As shown in FIG. 8, the reception frequency of the tuner unit 10 is first the upper limit frequency f21 of the search range, thereafter, changes to the frequency f22 which is one-step lower, and then is gradually reduced at the same frequency interval. Then, when the broadcast signal of the desired channel is received in the tuner unit 10 at the reception frequency fa, the control unit 91 fixes the reception frequency of the tuner unit 10 to the frequency fa and ends the search process.

Search Algorithm 3

Figure 9:
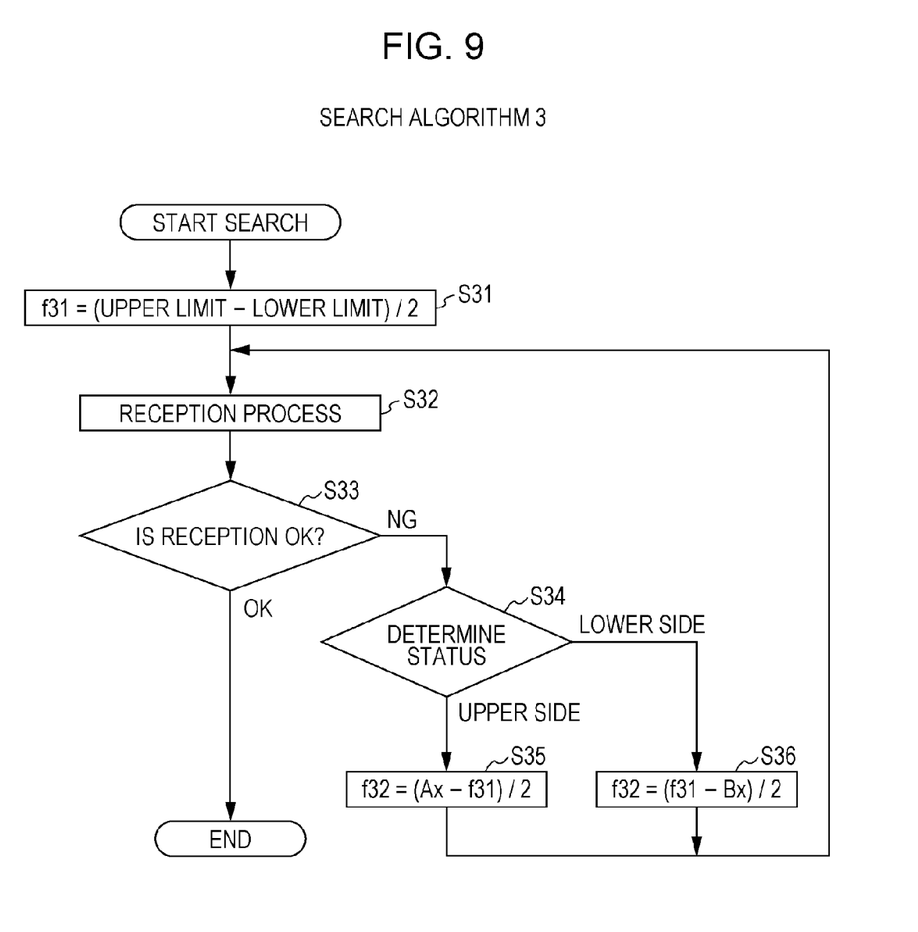
FIG. 9 is a flow chart showing an example of a search algorithm 3 according to the embodiment of the present disclosure.
Figure 10:
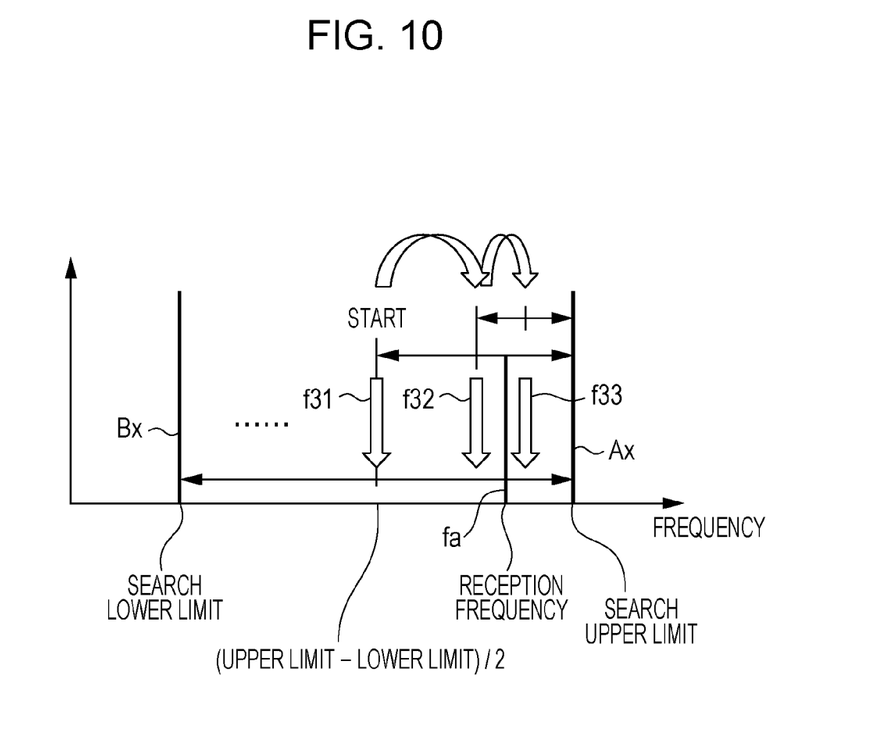
FIG. 10 is a characteristic diagram showing a process example of the search algorithm 3 according to the embodiment of the present disclosure.

FIG. 9 is a flow chart showing a search algorithm 3. FIG. 10 is a diagram showing an example of a change of the reception frequency when the search algorithm 3 is performed.

The search algorithm 3 is intended to perform a binary search from an approximate center of a search range. In other words, as shown in FIG. 9, when the search algorithm 3 is performed, the control unit 91, first, determines a search range of the search of a transmission frequency of a desired channel. Then, the control unit 91 sets the frequency f31 of the center between the lower limit frequency and the upper limit frequency of the search range to a frequency fx to be searched first (step S31). The frequency f31 of the center of the search range is calculated by (upper limit frequency Ax−lower limit frequency Bx)/2.

Then, in order to receive the upper limit frequency f31, the control unit 91 sets the reception frequency in the tuner unit 10 (step S32). At this time, the control unit 91 instructs the local oscillation circuit 12 to generate a local oscillation signal of which frequency is the frequency corresponding to the upper limit frequency f31.

Then, the control unit 91 determines whether or not the broadcast signal of the desired channel in the reception process is received (step S33). In the determination, when the broadcast signal of the desired channel is received, the reception at the frequency continues and the search process is ended.

In the determination of step S33, when the broadcast signal of the desired channel is not received, the control unit 91 determines which side of the upper side and the lower side of the present search frequency f31 on which the frequency fa to be searched is present (step S34). In the determination, when it is determined that the frequency fa is present on the upper side, the control unit 91 sets the frequency f32 to be next searched to the center between the present search frequency f31 and the upper limit frequency Ax (step S35). The search frequency f32 at this time is calculated by (upper limit frequency Ax−search frequency f31)/2.

Further, in the determination of step S34, when it is determined that the frequency fa is present on the lower side, the control unit 91 sets the frequency f32 to be next searched to the center between the present search frequency f31 and the lower limit frequency Bx (step S36). The search frequency f32 at this time is calculated by (search frequency f31−lower limit frequency Bx)/2.

Then, returning to step S32, the control unit 91 sets a reception frequency in the tuner unit 10 in order to receive a reception frequency f32 which is set in step S35 or step S36.

Hereinafter, the control unit 91 causes the process of steps S32 to S36 to be repeatedly executed until the tuner unit 10 can receive the broadcast signal of the desired channel so as to control the reception frequency to gradually approach the desired reception frequency. In addition, steps S35 and S36 of FIG. 7 show the change in the search frequency from the frequency f31 to the frequency f32, but at each time when the process of steps S35 and S36 is repeated, the frequency that is set is changed to approach the desired frequency in order of f32, f33, ....

FIG. 10 shows an example of a change of the reception frequency in the tuner unit 10 when the control unit 91 performs the search algorithm 3. The example of FIG. 10 is an example in which after the reception frequency of the tuner unit 10 first becomes the frequency f31 in the center of the search range, it is determined in step S34 that the search frequency fa is above the center. In this example, the reception frequency is changed to f31, f32, and f33 to approach the frequency fa at which the broadcast signal of the channel is transmitted and finally becomes the frequency fa. At this time, the search process is ended.

In addition, a search algorithm other than the three search algorithms described so far is prepared, and thus the control unit 91 may attempt the search algorithm at the time of tuning.

As described above, according to the examples of the present disclosure, when it is unavoidable the oscillation frequency in the search from becoming approximately the same as that of the tuner unit performing reception, the tuner unit performs reception, which is disposed farthest from the corresponding tuner performing reception. Accordingly, even when a plurality of tuner units use approximately the same oscillation frequency in the search, there is some interval between the plurality of tuner units, so that it is possible to prevent as much as possible the occurrence of problems caused by that the oscillation frequency of two tuner units being the same. In other words, when the local oscillation frequency signals in two tuner units have the same or close frequency, there is a possibility that two tuner units disturb each other. However, since two tuner units are separated, the level of disturbance is low and any disturbance is prevented as much as possible.

In addition, in Example 2 described in the flowchart of FIG. 4, when it is avoided that the oscillation frequencies of two tuner units match or are close to each other by the change of a search algorithm, it is assumed to preferentially perform the avoidance process. Accordingly, Example 2 has the advantage in which situations causing interference occur less.

5. Modification Example

The arrangement number of tuner units shown in FIG. 1 is intended to show an example, and tuner units of other numbers may be disposed. Further, the examples of the search algorithms described in FIGS. 3 to 10 are intended to show suitable algorithms, and other search algorithms may be prepared and be a candidate at the time of selecting a search algorithm.

Further, in the example shown in FIG. 1, each of the tuner units 10 to 80 is a tuner unit to which a signal received by a single antenna 94 is supplied. In contrast, for example, each tuner unit may include both of a tuner which receives terrestrial broadcast signals and a tuner which receives satellite broadcast signals, so that a plurality of antennas may also be connected thereto. Alternatively, a tuner unit of a first group among a plurality of tuner units may be a tuner unit which receives terrestrial broadcast signals and a tuner unit of a second group thereof may be a tuner unit which receives satellite broadcast signals.

In addition, in the selection process examples of the tuner units shown in the flowcharts of FIGS. 3 and 4, it is assumed that the control unit 91 determines whether the oscillation frequency of the voltage controlled oscillator at the time of search matches or is close to the oscillation frequency of the voltage controlled oscillator in the local oscillation circuit included in a separate tuner unit. In contrast, the control unit may determine whether or not the frequency of the local oscillation signal as it is which is supplied to the tuner unit at the time of search matches or is close to the frequency of the local oscillation signal which is supplied to the reception circuit of a separate tuner unit so as to select a search algorithm based on the determination.

Further, the example shown in FIG. 1 is applied to the control of the tuner unit which receives television broadcast signals. In contrast, the process of the present disclosure may be applied to various reception apparatuses including a plurality of tuner units which receive wireless transmission signals and wired transmission signals other than the television broadcast signals.

In addition, the present disclosure may have the following configurations.

(1)

A reception apparatus including: a plurality of reception circuits disposed in a predetermined arrangement state, a plurality of local oscillation circuits each of which supplies a local oscillation signal to each of the plurality of reception circuits, and a control unit that controls a tuning of a reception circuit disposed at each position, and when there is a specific reception circuit to which a local oscillation signal is supplied, of which frequency matches or is close to a passing frequency during a search of a reception signal with a tuning request, performs the search of the reception signal with the tuning request in a reception circuit disposed at a position far from the specific reception circuit.

(2)

The reception apparatus according to (1), in which when there is a local oscillation signal of which frequency matches or is close to the passing frequency during the search of the reception signal with the tuning request, the control unit attempts to change a search algorithm for searching the received signal with the tuning request, and in which when there is the specific reception circuit to which the local oscillation signal is supplied, of which frequency matches or is close to the passing frequency even by changing the search algorithm, the control unit performs the search of the reception signal with the tuning request in a reception circuit disposed at a position far from the specific reception circuit.

(3)

The reception apparatus according to (2), in which as the search algorithm, at least two search algorithms including a search algorithms that performs a search from a lower side of a search frequency range and a search algorithms that performs a search from an upper side of the search frequency range are prepared.

(4)

The reception apparatus according to (2) or (3), in which as the search algorithm, at least a search algorithm that performs a search from an approximately center of the search frequency range is prepared.

(5)

The reception apparatus according to any one of (1) to (4), in which when there is a local oscillation signal of which frequency matches or is close to the passing frequency during the search of the reception signal with the tuning request, the control unit attempts to change a setting of a frequency divider included in the local oscillation circuit which supplies a local oscillation signal used in the search of the reception signal with the tuning request, and then when there is the specific reception circuit to which the local oscillation signal is supplied, of which frequency matches or is close to the passing frequency, the control unit performs the search of the reception signal with the tuning request in a reception circuit disposed at a position far from the specific reception circuit.

(6)

Electronic equipment including: a plurality of reception circuits disposed in a predetermined arrangement state; a plurality of local oscillation circuit each of which supplies a local oscillation signal to each of the plurality of reception circuits; a control unit that controls a tuning of a reception circuit disposed at each position, and when there is a specific reception circuit to which a local oscillation signal is supplied, of which frequency matches or is close to a passing frequency during a search of a reception signal with a tuning request, performs the search of the reception signal with the tuning request in a reception circuit disposed at a position far from the specific reception circuit; and a processing unit that processes signals which are received in the plurality of reception circuits.

It should be understood by those skilled in the art that various modifications, combinations, sub-combinations and alterations may occur depending on design requirements and other factors insofar as they are within the scope of the appended claims or the equivalents thereof.

What is claimed is:

1. A reception apparatus comprising:
    a plurality of reception circuits disposed in a predetermined arrangement;
    a plurality of local oscillation circuits each of which supplies a local oscillation signal to a corresponding one of the plurality of reception circuits; and
    a control unit that separately controls a tuning of the reception circuits and when there is a specific reception circuit to which a local oscillation signal is supplied, of which frequency matches or is close to a passing frequency during a search of a reception signal with a tuning request, performs the search of the reception signal with the tuning request in an available reception circuit that, as compared to any other available reception circuit, is disposed at a position farthest from the specific reception circuit.

2. The reception apparatus according to claim 1,
    wherein when there is a local oscillation signal of which frequency matches or is close to the passing frequency during the search of the reception signal with the tuning request, the control unit attempts to change a setting of a frequency divider included in the local oscillation circuit which supplies a local oscillation signal used in the search of the reception signal with the tuning request, and then when there is the specific reception circuit to which the local oscillation signal is supplied, of which frequency matches or is close to the passing frequency, the control unit performs the search of the reception signal with the tuning request in a reception circuit disposed at a position far from the specific reception circuit.

3. A reception apparatus comprising:

a plurality of reception circuits disposed in a predetermined arrangement;

a plurality of local oscillation circuits each of which supplies a local oscillation signal to a corresponding one of the plurality of reception circuits; and a control unit that separately controls a tuning of the reception circuits, and when there is a specific reception circuit to which a local oscillation signal is supplied, of which frequency matches or is close to a passing frequency during a search of a reception signal with a tuning request, the control unit attempts to change a search algorithm for searching the received signal with the tuning request, and wherein when there is the specific reception circuit to which the local oscillation signal is supplied, of which frequency matches or is close to the passing frequency even by changing the search algorithm, the control unit performs the search of the reception signal with the tuning request in a reception circuit disposed at a position farthest from the specific reception circuit.

4. The reception apparatus according to claim 3, wherein as the search algorithm, at least two search algorithms including a search algorithm that performs a search from a lower side of a search frequency range and a search algorithm that performs a search from an upper side of the search frequency range are prepared.

5. The reception apparatus according to claim 3, wherein as the search algorithm, at least a search algorithm that performs a search from an approximately center of the search frequency range is prepared.

6. Electronic equipment comprising:

a plurality of reception circuits disposed in a predetermined arrangement;

a plurality of local oscillation circuits each of which supplies a local oscillation signal to a corresponding one of the plurality of reception circuits;

a control unit that controls a tuning of a reception circuit disposed at each position, and when there is a specific reception circuit to which a local oscillation signal is supplied, of which frequency matches or is close to a passing frequency during a search of a reception signal with a tuning request, performs the search of the reception signal with the tuning request in an unused reception circuit that is disposed at a position farthest from the specific reception circuit; and a processing unit that processes signal which are received in the plurality of reception circuits.

* * * * *